United States Patent
Onishi

(10) Patent No.: US 9,235,287 B2
(45) Date of Patent: Jan. 12, 2016

(54) TOUCH PANEL APPARATUS AND TOUCH PANEL DETECTION METHOD

(75) Inventor: Yusuke Onishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 334 days.

(21) Appl. No.: 13/238,220

(22) Filed: Sep. 21, 2011

(65) Prior Publication Data

US 2012/0127123 A1 May 24, 2012

(30) Foreign Application Priority Data

Nov. 24, 2010 (JP) ................................. 2010-261359

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01)

(58) Field of Classification Search
CPC ...... G06F 3/044; G06F 3/0428; G06F 1/3262
USPC ........................................................ 345/173
See application file for complete search history.

(56) References Cited

U.S. PATENT DOCUMENTS

| | | | |
|---|---|---|---|
| 2009/0066665 A1* | 3/2009 | Lee | 345/173 |
| 2010/0066692 A1 | 3/2010 | Noguchi et al. | |
| 2010/0309171 A1* | 12/2010 | Hsieh et al. | 345/204 |
| 2011/0025629 A1* | 2/2011 | Grivna et al. | 345/173 |
| 2011/0157078 A1* | 6/2011 | Miyazawa et al. | 345/174 |
| 2012/0075205 A1* | 3/2012 | Huang et al. | 345/173 |

FOREIGN PATENT DOCUMENTS

JP 2010-72743 4/2010

OTHER PUBLICATIONS

U.S. Appl. No 14/116,137, filed Nov. 7, 2013, Onishi.

* cited by examiner

*Primary Examiner* — Lixi C Simpson
(74) *Attorney, Agent, or Firm* — Hazuki International, LLC

(57) ABSTRACT

A touch panel apparatus includes a detector configured to detect contact or approach of an object to a panel within a detection range of the panel, a controller configured to execute the detection on the entire panel and control the detection range in accordance with a result of the detection, and an output unit configure to determine and output a position corresponding to the contact or the approach of the object within the detection range controlled by the controller.

18 Claims, 14 Drawing Sheets

BACKGROUND ART

TOUCH PANEL APPARATUS AND TOUCH PANEL DETECTION METHOD

BACKGROUND

The present disclosure relates to a touch panel apparatus which is suitably applicable to a projection electrostatic-capacitance touch-panel apparatus and a touch-panel detection method.

An electrostatic-capacitance touch panel employing a projection method has been in practical use and has been used in various electronic apparatuses. In a projection electrostatic-capacitance touch-panel in which transparent electrodes are arranged in a grid pattern as two layer structures on a transparent substrate on a display panel such as a liquid crystal display panel, a touch position is detected by detecting change of electrostatic capacitance caused by a finger touch. Note that, in the electrostatic-capacitance touch panel, in addition to a case where a panel surface is directly touched by a finger, a case where a finger approaches the panel surface may be detected by change of the electrostatic capacitance.

Since the electrostatic-capacitance touch panel detects change of electrostatic capacitance, in a waiting state for detection of a touch, a signal is continuously applied to the electrodes of the touch panel so that touch detection may be performed.

FIGS. 15A and 15B show examples of general driving of the electrostatic-capacitance touch panel.

In general, in the electrostatic touch panel, two states, i.e., an active state in which touch detection is being performed and an idling state in which the panel is in a standby state until a touch is detected are set.

FIG. 15A shows a driving example in the active state and FIG. 15B shows a driving example in the idling state. In FIGS. 15A and 15B, axes of ordinate denote power consumption of a driving signal and axes of abscissa denote time.

The driving example in the active state shown in FIG. 15A will be described. When the panel surface is touched by a finger, for example, the touch state should be detected in a comparatively short cycle, and therefore, a waiting time after a measurement is set to be short so that a comparatively short measurement cycle is attained. One measurement cycle is approximately 20 to 50 ms, for example. Since the measurement cycle is set to be short, excellent touch detection may be performed in accordance with movement of the finger.

The driving example in the idling state shown in FIG. 15B will be described. In a state in which the finger or the like is not touched to the touch panel, for example, the waiting time after a measurement is set to be long so that a measurement cycle is set to be long. Accordingly, power consumption of the touch panel is reduced. One measurement cycle is approximately 50 to 100 ms, for example.

When the touch state is detected in the idling state, the active state is entered. When a touch is not detected for a predetermined period of time in the active state, the idling state is entered.

Japanese Unexamined Patent Application Publication No. 2010-72743 discloses a configuration of an electrostatic-capacitance touch panel and a detection principle.

SUMMARY

As shown in FIG. 15, by setting the active state and the idling state, both of reduction of power consumption in the idling state and improvement of detection capability in the active state are attained. However, there arises a problem in that, since a measurement cycle is long in the idling state, accuracy of touch detection is deteriorated. Specifically, in a case where an operation of detecting a finger which approaches the panel is detected and thereafter detecting a touch of the finger to the panel is to be performed, it is possible that the touch of the finger to the panel is detected without detecting a movement of the finger which approaches the panel. Depending on an application which uses the touch panel, this is not preferable in many cases. To address this problem, the touch panel may be in an active state on a steady basis. However, if the touch panel is in the active state on a steady basis, measurement should be performed in a short cycle on a steady basis although a timing when an object to be detected approaches the touch panel is unknown, and accordingly, power consumption is increased.

Furthermore, in recent years, in such a touch panel, there is a tendency that a measurement period becomes long since a size of the panel is increased and a multi-touch recognition in which two or more fingers are simultaneously detected is enabled, and accordingly, power consumed in one measurement increases. Specifically, the number of detection lines included in the touch panel is increased due to the increase of the size of the panel, and as a result, the measurement period and the power consumption are increased. Furthermore, when the multi-touch is recognized, the larger the number of fingers to be recognized becomes, the longer a period of time used for coordinate calculation becomes. Accordingly, when a plurality of fingers which approach a large touch panel are to be detected, a considerably long measurement period is used and power consumption is increased.

Furthermore, although such a touch panel generally detects touch by a finger or approach of a finger, there is a demand for detection of various objects having different sizes such as a palm, a tip of a finger, and a stylus. However, such detection may not be appropriately performed when scanning is performed for each line or for each intersection in a general manner.

Note that, although the problems have been described taking the electrostatic-capacitance touch panel as an example in the foregoing description, other touch panels which employ other methods and which have detection lines arranged in the panels have the same problems.

It is desirable to appropriately attain reduction of power consumption and improvement of detection capability when touch of an object and approach of an object are detected by the touch panel.

According to the present disclosure, contact or approach of an object to the panel is detected for individual lines disposed on a certain plane of the panel in a grid pattern or for individual intersections of the lines so that a position of the contact or the approach of the object to the panel is detected.

When the position detection is performed, a detection process is performed on all the integrated lines or all the integrated intersections and a control process is performed to control a detection range of lines or intersections to be detected in accordance with a result of the detection. Then, within the range determined by the control process, the position of the contact or the approach of the object is determined for individual lines or for individual intersections and information on the position is output.

In this way, since the detection process is performed by integrating all the lines or all the intersections, contact or approach of an object may be detected in the entire panel plane and a detection range may be appropriately set in accordance with an entire detection state.

Accordingly, detection range may be appropriately set in accordance with a result of detection of contact or approach of an object in the entire panel plane and a detection process is performed only on the set detection range in a certain state, and accordingly, improvement of detection accuracy and reduction of power consumption are attained.

DETAILED DESCRIPTION OF EMBODIMENTS

Embodiments of the present disclosure will be described in the following order.
1. Example of Configuration of Apparatus (FIG. 1)
2. Explanation of Flow of Pre-Measurement Process (FIG. 2)
3. Example of Process of Measuring Entire Sensing Plane (FIG. 3)
4. Example of Process of Measuring Divided Sensing Planes (FIG. 4)
5. Example of Process of Measuring Peripheral Portions of Sensor (FIG. 5)
6. Explanation of Flow of Recursive Process (FIG. 6)
7. Example of Process of Measuring Button Display Region (FIGS. 7 to 10)
8. Example of Process when Priority is Given to Preceding Detection Region (FIG. 11)
9. Example of Region Setting Process Based on Prediction (FIG. 12)
10. Example of Execution of Division Measurement (FIGS. 13 and 14)
11. Modifications 1. Example of Configuration of Apparatus First, an example of an entire configuration of a touch panel apparatus according to an embodiment of the present disclosure will be described with reference to FIG. 1. In this embodiment, a touch panel apparatus employs a projection electrostatic-capacitance touch-panel. Note that the projection electrostatic-capacitance touch-panel is merely an example, and the present disclosure is applicable to other touch panels having different methods which will be described hereinafter as modifications.

Figure 1:
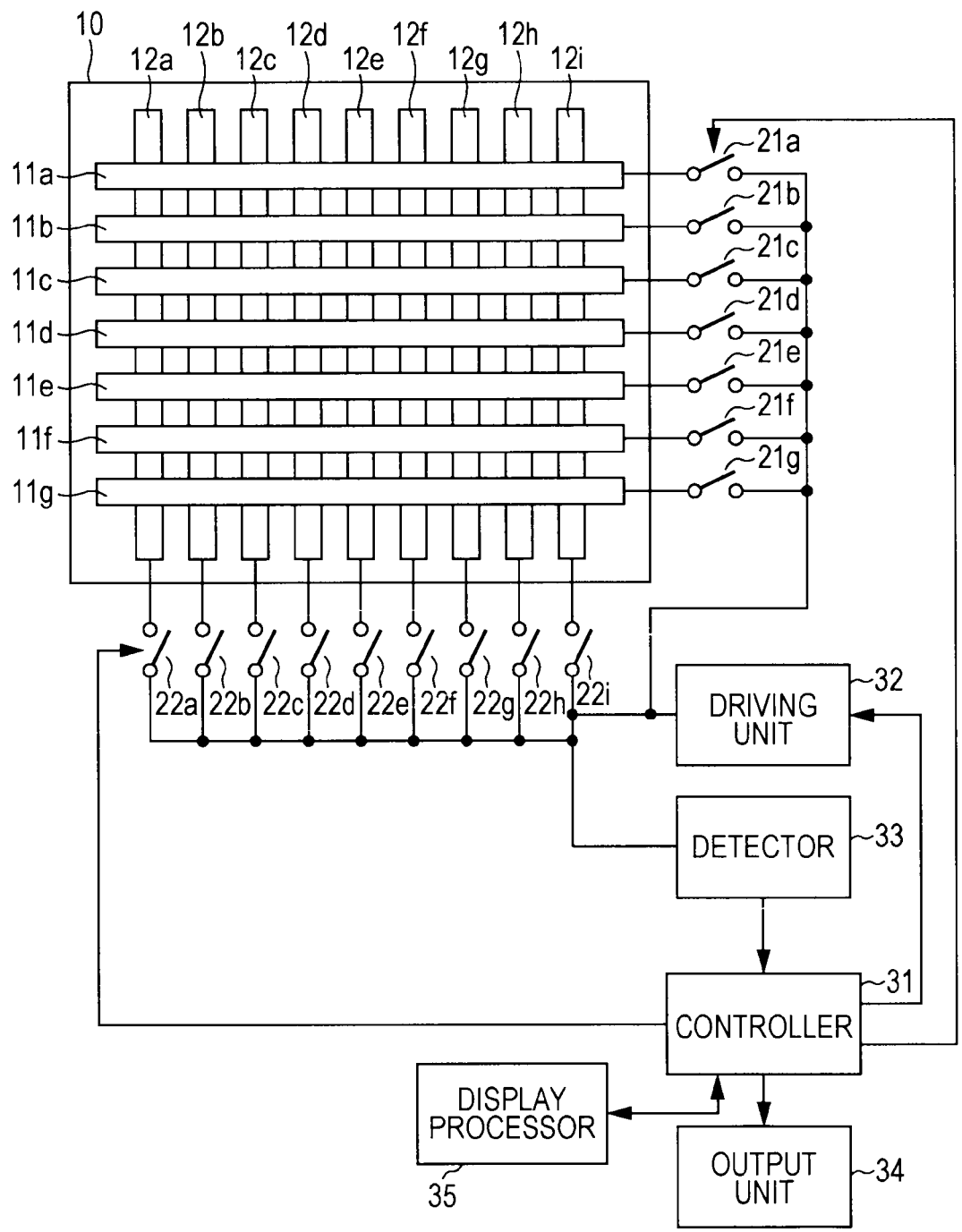
FIG. 1 is a diagram illustrating a configuration of a touch panel apparatus according to an embodiment of the present disclosure.

The touch panel shown in FIG. 1 includes a panel 10 disposed in a display plane of an image display panel such as a liquid crystal display panel. When an object contacts or approaches a surface of the panel 10, a position corresponding to the contact or the approach is detected. The panel 10 is constituted by a transparent glass plate or a resin film. Note that the panel 10 included in the touch panel may be constituted separately from the display panel or may be integrally constituted with a display panel which displays images.

The panel 10 includes transparent electrode lines $11a$ to $11g$ which extend in parallel with one another in an X direction (horizontal direction in FIG. 1) on a certain plane at regular intervals. Furthermore, the panel 10 includes transparent electrode lines $12a$ to $12i$ which extend in parallel with one another in a Y direction (vertical direction in FIG. 1) which is orthogonal to the X direction at regular intervals. The lines $11a$ to $11g$ extending in the X direction and the lines $12a$ to $12i$ extending in the Y direction are arranged on different planes of the panel 10, for example. When an object contacts or approaches a surface of the panel 10, an electrostatic capacitance is changed at an intersection portion in which one of the lines extending in the X direction and one of the lines extending in the Y direction which are located in the vicinity of a position corresponding to the contact or the approach. The change of the electrostatic capacitance is detected to determine the position corresponding to the contact or the approach. The touch panel which determines the position corresponding to the contact or the approach in accordance with the change of the electrostatic capacitance at the intersection portion of the lines arranged in a grid pattern is referred to as a "projection electrostatic-capacitance touch-panel".

The intervals among the lines $11a$ to $11g$ extending in the X direction may be different from the intervals among the lines $12a$ to $12g$ extending in the Y direction. Note that FIG. 1 shows the principle of the touch panel apparatus, and a small number of lines are shown in FIG. 1 for simplicity of the description as an example. However, a larger number of lines are arranged in practice.

The lines $11a$ to $11g$ extending in the X direction function as lines to which detection voltage signals are supplied from a driving unit 32. As shown in FIG. 1, switches $21a$ to $21g$ are arranged between the driving unit 32 and the lines $11a$ to $11g$ extending in the X direction so as to correspond to the lines. A signal is supplied to a line corresponding to a switch in a closed state. Close states and open state of the switches $21a$ to $21g$ are individually controlled by a controller 31.

The lines 12a to 12i extending in the Y direction function as lines which detect signal states in a detection unit 33. In this example, an electrostatic capacitance is detected as a signal state, and the detection unit 33 executes a process of detecting change of an electrostatic capacitance. As shown in FIG. 1, switches 22a to 22i are arranged between the detection unit 33 and the lines 12a to 12i extending in the Y direction so as to correspond to the lines. An electrostatic capacitance corresponding to a switch in a close state is detected. Close states and open states of the switches 22a to 22i are individually controlled by a controller 31.

The controller 31 is a control processor which controls entire operation of the touch panel apparatus. A display process state of a display processor 35 which drives display of a display panel (not shown) which is overlapped with the panel 10 is executed also under control of the controller 31. Alternatively, even when the controller 31 does not perform display control, the controller 31 obtains information on a display state from the display processor 35.

The controller 31 includes a processor which performs an integrated-region determination process in which measurements are simultaneously performed in accordance with a present display state. In accordance with a region determination process performed by an integrated-region determination processor, the open states and the close states of the switches 21a to 21g are individually controlled and lines to which a signal is supplied from the driving unit 32 among the lines 11a to 11g extending in the X direction are changed in a predetermined pattern within one measurement period. Switches among the switches 22a to 22i which set corresponding lines among the lines 12a to 12i extending in the Y direction which are to be detected by the detection unit 33 are also changed in a predetermined pattern within one measurement period, and the lines among the lines 12a to 12i extending in the Y direction in which electrostatic capacitances are detected are also changed in a predetermined pattern within one measurement period.

Figure 15A:
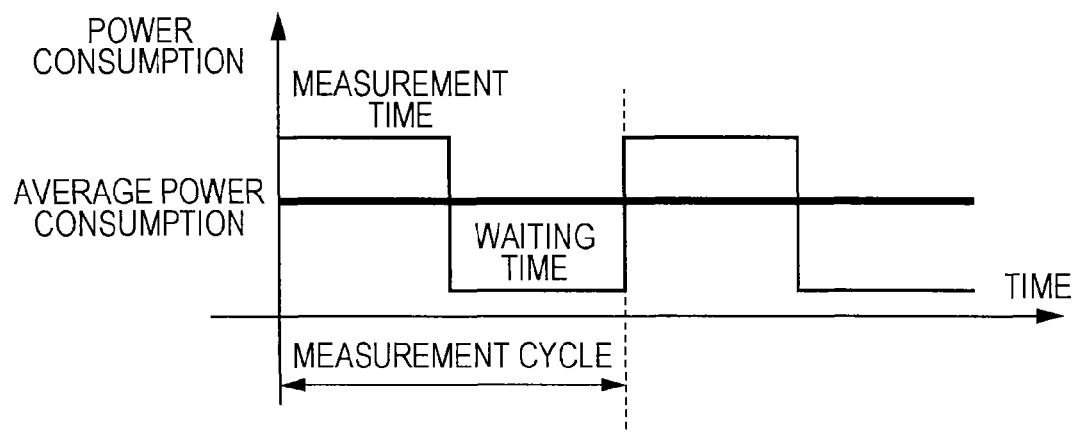
FIGS. 15A and 15B are diagrams illustrating measurement cycles and power consumption in an active state and an idling state of a general touch panel.
Figure 15B:
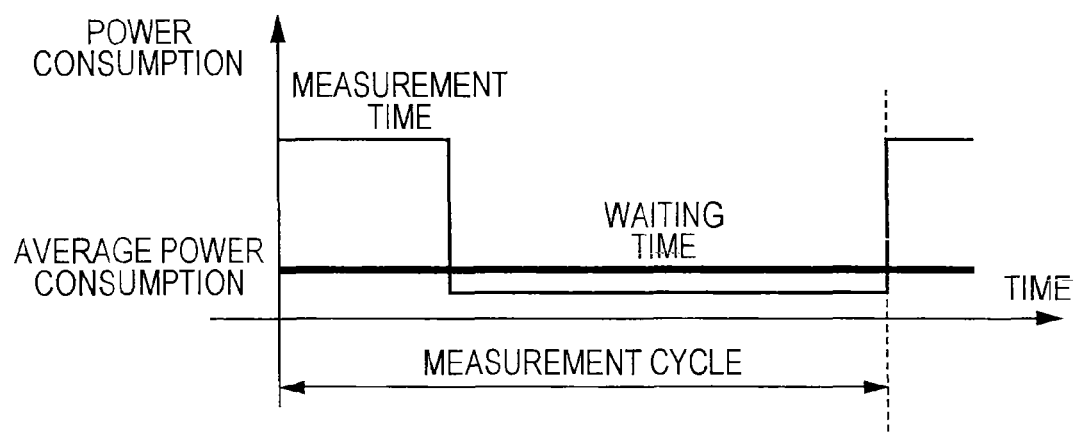

For example, when the switch 21a is brought to a close state and in addition the switch 22a is brought to a close state, an electrostatic capacitance in the vicinity of an intersection of the lines 11a and 12a is measured by the detection unit 33. Accordingly, the contact or the approach of the object may be detected in a position of the intersection of the lines 11a and 12a. By this, a combination of the open states and the close states of the switches enables detection of contact or approach of an object at all intersection positions, and in general, detection of contact or approach of an object is performed in positions of all intersections within one measurement period shown in FIGS. 15A and 15B. Although control states of the individual switches of this embodiment will be described in detail hereinafter, measurement may be performed in the individual intersection positions by sequentially open and close the individual switches and alternatively, measurement may be performed in a large region on the panel while a plurality of switches are collectively brought to close state.

Information on the contact or the approach of the object in the individual positions detected by the detection unit 33 is supplied to the controller 31, the controller 31 supplies the information on the contact or the approach to an output unit 34, and the information is output from the touch panel apparatus. In accordance with the information on a position of the contact or the approach of the object output from the output unit 34, an apparatus (including the touch panel apparatus) which executes applications using the touch panel performs an execution process using the information on the position of the contact or the approach.

2. Explanation of Flow of Pre-Measurement Process

Next, a preprocess performed before a contact state or an approach state of an object such as a finger is measured by the touch panel apparatus of this embodiment will be described with reference to a flowchart shown in FIG. 2.

Here, the measurement process is performed for detecting contact or approach of an object at intersection positions within one measurement period included in a unit of measurement cycle shown in FIG. 15. For example, the measurement process is performed as a preprocess of measuring intersections within one measurement period.

Figure 2:
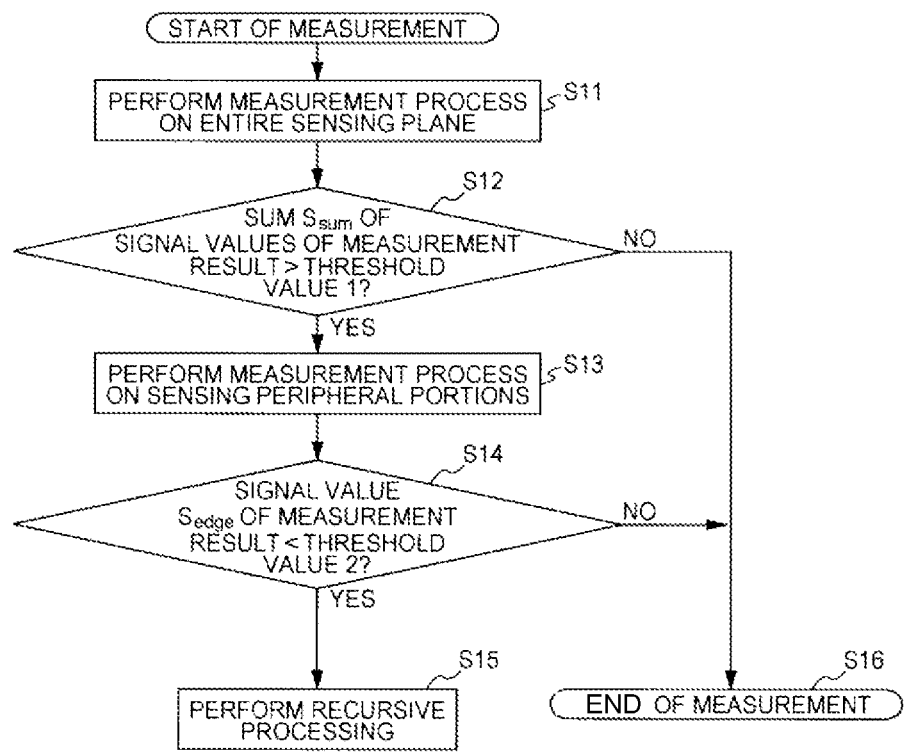
FIG. 2 is a flowchart illustrating pre-measurement process according to the embodiment of the present disclosure.

Referring to FIG. 2, when measurement of the preprocess is started, a process of measuring an entire sensing plane is started (in step S11).

Figure 3:
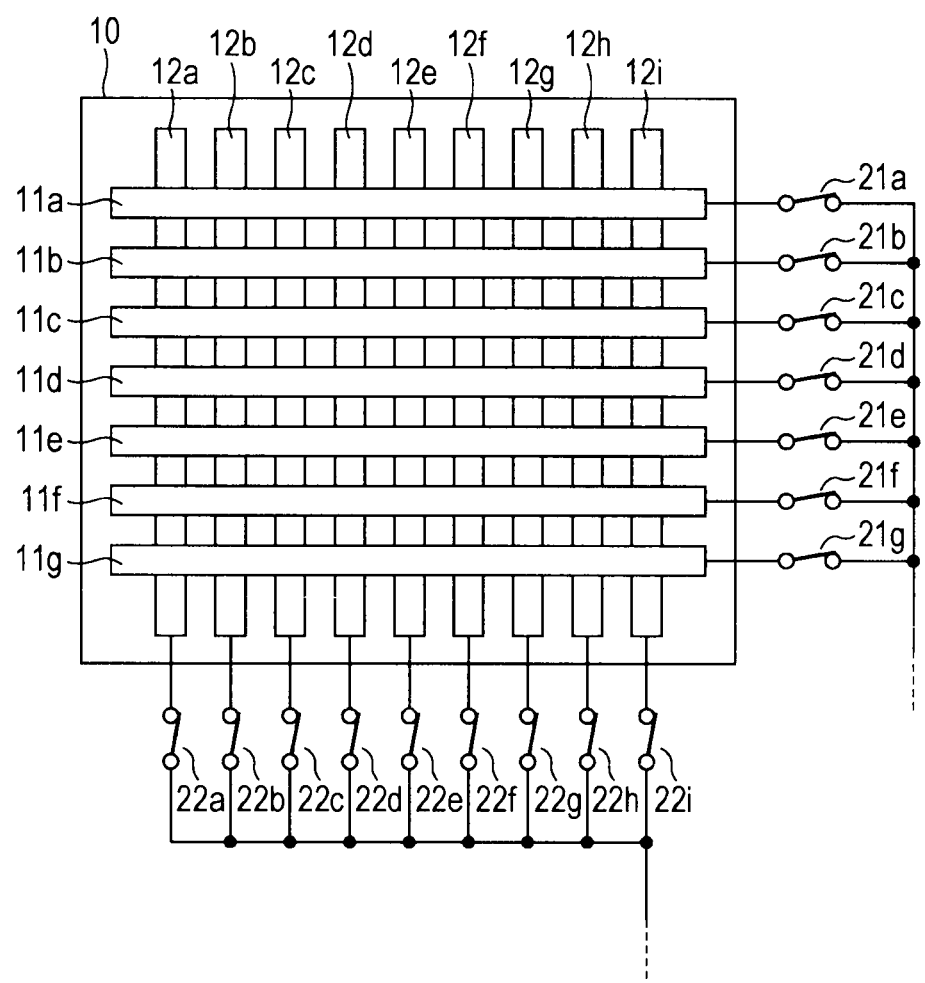
FIG. 3 is a diagram illustrating measurement of an entire sensing plane according to the embodiment of the present disclosure.

In the process of measuring the entire sensing plane, all the switches 21a to 21g and the switches 22a to 22i are simultaneously brought to close states as shown in FIG. 3 and a signal value $S_{sum}$ corresponding to a sum of electrostatic capacitance values is measured. Note that the measurement of the entire sensing plane shown in FIG. 3 will be described in detail hereinafter.

Then, the controller 31 compares the obtained signal value $S_{sum}$ with a predetermined first threshold value so as to determine whether the signal value $S_{sum}$ is larger than (or equal to or larger than) the first threshold value (in step S12). The first threshold value is set to determine whether simultaneous touch or simultaneous approach is detected in a large region.

In this determination, when it is determined that the signal value $S_{sum}$ is not larger than the first threshold value, the controller 31 determines that any object does not contact or approach the panel 10 and the process proceeds to step S16, that is, the measurement process within one measurement period at this timing is terminated.

Furthermore, in step S12, when it is determined that the signal value $S_{sum}$ is larger than the first threshold value, the process proceeds to a process of measuring sensor peripheral portions (in step S13).

Figure 5:
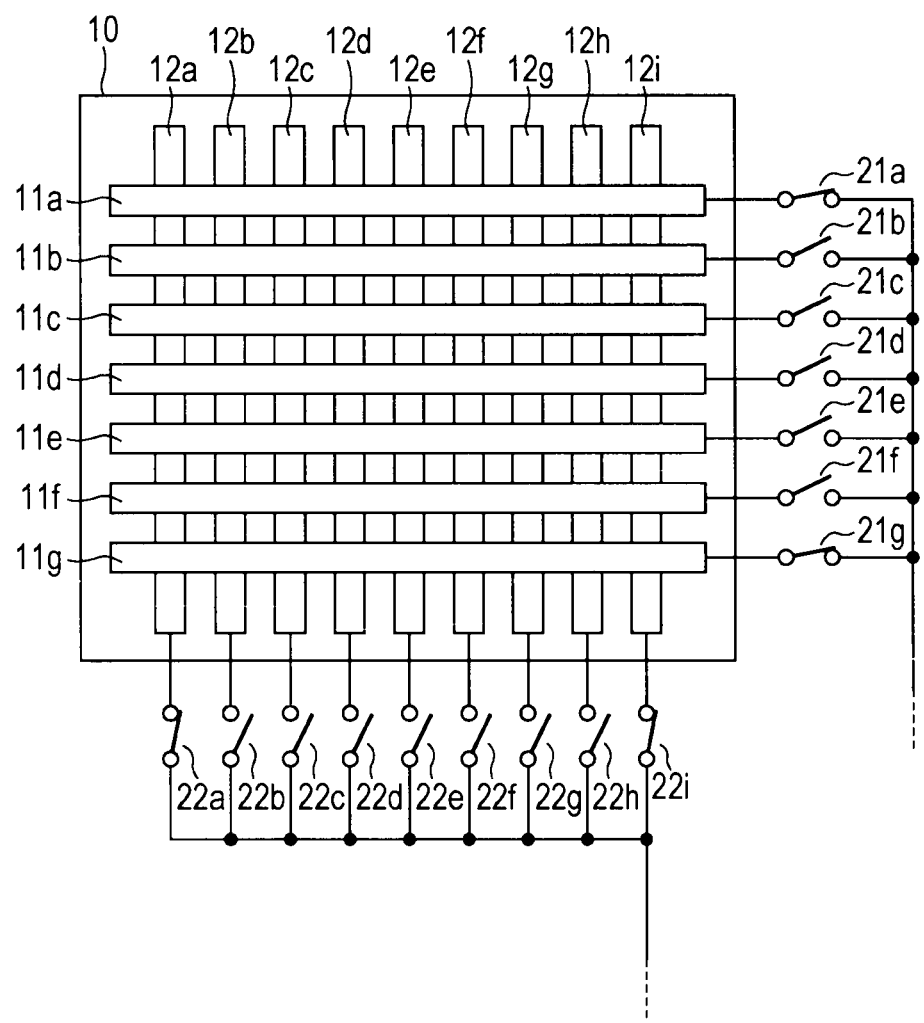
FIG. 5 is a diagram illustrating measurement of peripheral portions of the sensing plane according to the embodiment of the present disclosure.

In the process of measuring sensor peripheral portions, as shown in FIG. 5, for example, only the switches 21a, 21g, 22a, and 22i which are connected to the four lines 11a, 11g, 12a, and 12i of peripheral ends of the panel 10, respectively, are simultaneously brought to close states and a signal value $S_{edge}$ of edge portions corresponding to an electrostatic capacitance value is measured. Note that the measurement of the edge portions shown in FIG. 5 will be described in detail hereinafter.

Then, the controller 31 compares the obtained signal value $S_{edge}$ with a predetermined second threshold value so as to determine whether the signal value $S_{edge}$ is smaller than (or equal to or smaller than) the second threshold value (in step S14). The second threshold value is set to determine whether contact is detected in the edge portions of the panel.

In this determination, when it is determined that the signal value $S_{edge}$ is smaller than the second threshold value, the controller 31 determines that the edge portions in the panel 10 have not been touched and the process proceeds to step S15 where a recursive process is performed.

Furthermore, when the signal value $S_{edge}$ is equal to or larger than the second threshold value, it is determined that some sort of object has contacted the edge portions of the panel, that is, it is determined that touch detection is not appropriately performed. Then, the process proceeds to step S16, that is, the measurement process within one measurement period at this timing is terminated.

The state in which the touch detection is not appropriately performed is specifically a state in which fingers or the like which hold a case of a device included in the touch panel apparatus contacts a range from an edge portion of the panel 10 to a surface of the case surrounding the panel 10, for example.

3. Example of Process of Measuring Entire Sensing Plane

Here, the process of measuring an entire sensing plane performed in step S11 in the flowchart shown in FIG. 2 will be described.

In the process of measuring the entire sensing plane, all the switches 21a to 21g and the switches 22a to 22i arranged in the panel 10 are simultaneously brought to close states as shown in FIG. 3 and a signal value $S_{sum}$ corresponding to a sum of electrostatic capacitance values is measured.

Since this state is set as shown in FIG. 3, changes of electrostatic capacitances at the intersections of the lines 11a to 11g extending in the X direction and the lines 12a to 12i extending in the Y direction which are arranged on the panel 10 are added to one another and a resultant value is detected by the detection unit 33. As for the detected signal value, different signal values are detected in different cases such as a case where a small object contacts in one of the intersections and a case where a comparatively large object contacts in a large region in the panel 10. Accordingly, in accordance with the signal value measured when the process of measuring the entire sensing plane, a size of the object which contacts or approaches may be determined. An example of a process performed in accordance with the determined size of the object will be described hereinafter.

4. Example of Process of Measuring Divided Sensing Planes

In the example shown in FIG. 3, the measurement process is performed on the entire sensing plane. However, the entire sensing plane may be divided into a plurality of regions and the measurement process may be performed on the individual divided regions.

Figure 4:
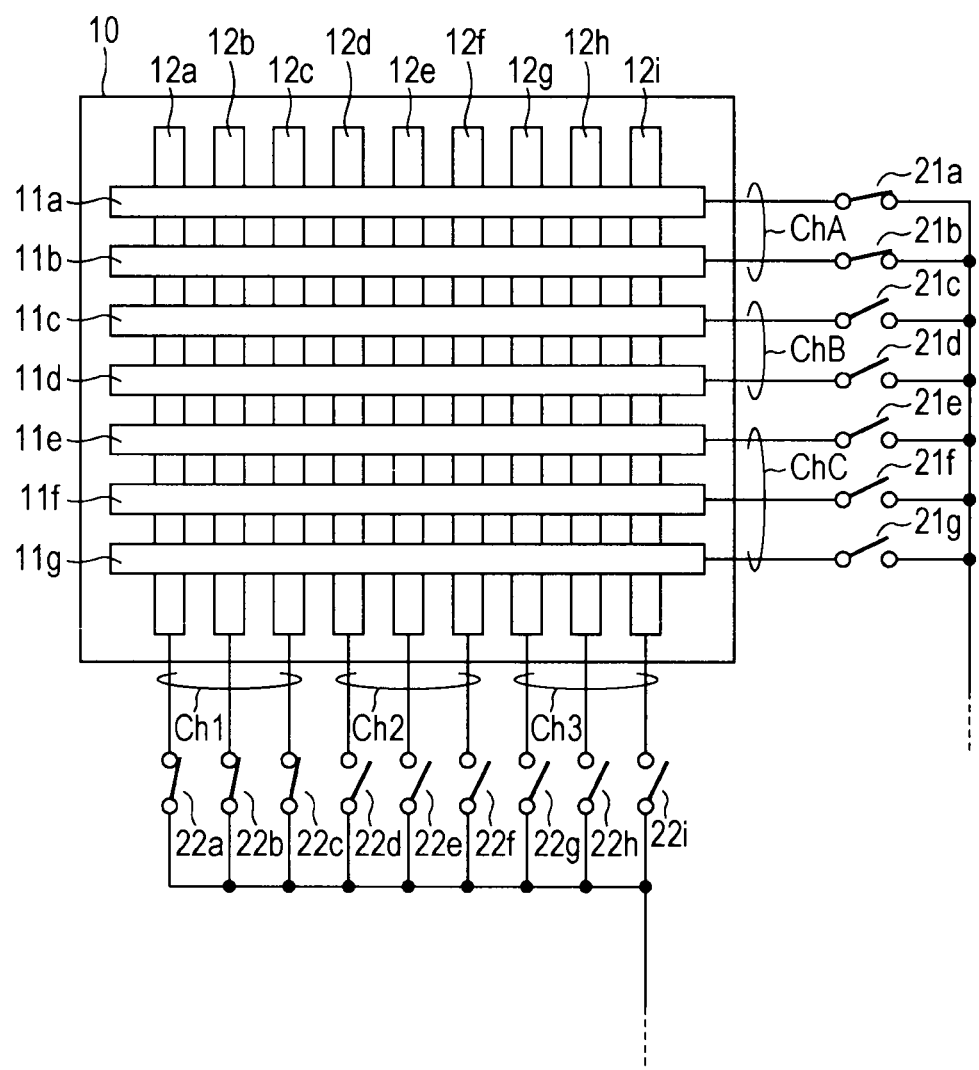
FIG. 4 is a diagram illustrating measurement performed when the sensing plane is divided according to the embodiment of the present disclosure.

Specifically, as shown in FIG. 4, for example, the lines 11a to 11g extending in the X direction are divided into three channels, i.e., channels ChA, ChB, and ChC and the lines 12a to 12i extending in the Y direction are divided into three channels, i.e., Ch1, Ch2, and Ch3 so that measurement is performed on nine regions of a matrix of three rows and three columns. In the example shown in FIG. 4, only the five switches 21a, 21b, 22a, 22b, and 22c are brought to close states and contact or approach is detected in regions of intersections of the channels ChA and Ch1.

An example of a case where the process of measuring division of the sensing plane will be described hereinafter.

5. Example of Process of Measuring Peripheral Portions of Sensor

Next, a measurement process at the edge portions of the panel performed in step S14 in the flowchart shown in FIG. 2 will be described.

FIG. 5 is a diagram illustrating the measurement process performed at the edge portions. Here, only the switches 21a, 21g, 22a, and 22i which are connected to the four lines 11a, 11g, 12a, and 12i of the peripheral terminals of the panel 10, respectively, are simultaneously brought to close states and a signal value $S_{edge}$ of the edge portions corresponding to an electrostatic capacitance value is measured. Although, in the example shown in FIG. 5, in each of the four sides, one of the lines located at an end is selected, some of the lines near the end may be selected to be used in the measurement.

By performing the measurement in the state shown in FIG. 5, a state in which changes of electrostatic capacitances are not appropriately detected since fingers or the like which hold the case of the device included in the touch panel apparatus cover the end portions of the panel 10 to the surrounding surface of the case can be avoided.

6. Explanation of Flow of Recursive Process

Figure 6:
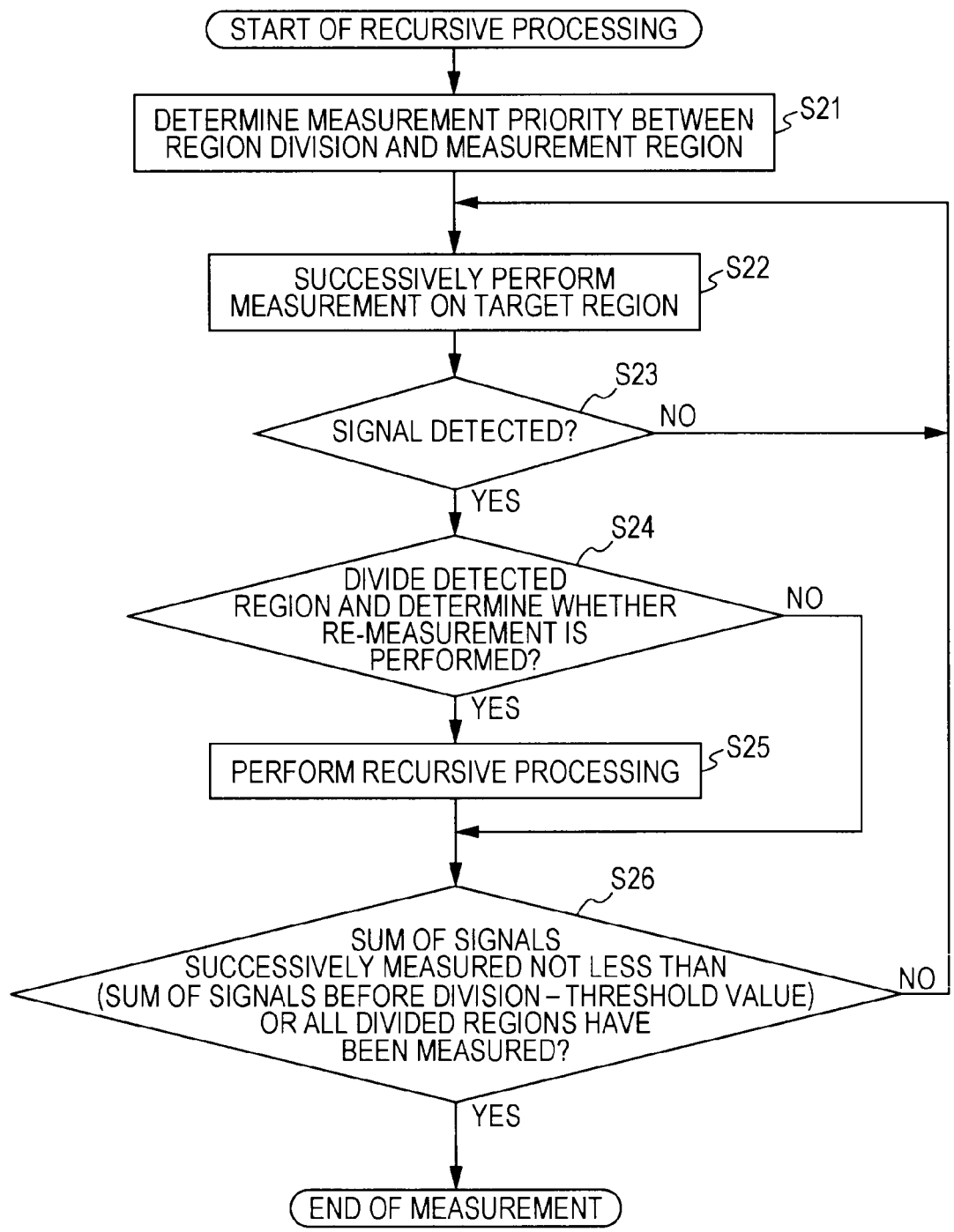
FIG. 6 is a flowchart illustrating a recursive process according to the embodiment of the present disclosure.

Next, a recursive measurement process performed in step S15 in the flowchart shown in FIG. 2 will be described with reference to a flowchart shown in FIG. 6.

When the recursive measurement process is started, first, priority levels of measurement based on a region division and measurement based on a measurement region are determined.

Specifically, it is determined whether a case where contact or approach is detected based on region division or a case where a specific region is measured taking contact or approach into consideration is selected as region measurement (in step S21). The case where the contact or approach is measured based on region division is set in accordance with an application (user interface) which is being executed and includes a case where the entire panel shown in FIG. 4 is uniformly divided for measurement and a case where the entire panel shown in FIG. 4 is divided in accordance with displayed buttons, for example.

In accordance with the determination in step S21, a target region is successively measured (in step S22), and it is determined whether a signal representing a state corresponding to contact or approach is detected (in step S23). When the signal representing a state corresponding to contact or approach is not detected, the process returns to step S22 and a next target region is measured.

Then, when an electrostatic capacitance representing a state corresponding to contact or approach is detected in step S23, it is determined whether the detected region is to be further divided for re-measurement (in step S24). When the re-measurement is to be performed, the target region is further divided or a recursive measurement process in which measurement is performed on intersections included in the region for each line is performed (in step S25).

Then, when it is determined that the re-measurement is not to be performed in step S24 or after the recursive measurement process is performed in step S25, it is determined whether a sum of signal values successively measured is equal to or larger than a value obtained by subtracting a threshold value from a sum of signal values before the division or all the divided regions have been subjected to the measurement (in step S26). Then, when the sum of the signal values successively measured is equal to or larger than the value obtained by subtracting the threshold value from the sum of the signal values before the division or all the divided regions have been subjected to the measurement, the process of one measurement period is terminated here.

When the sum of the signal values successively measured is not equal to or larger than the value obtained by subtracting the threshold value from the sum of the signal values before the division and when at least one of the division regions has not been subjected to the measurement, the process returns to step S22 where a next target region is subjected to measurement.

7. Example of Process of Measuring Button Display Region

Figure 7:
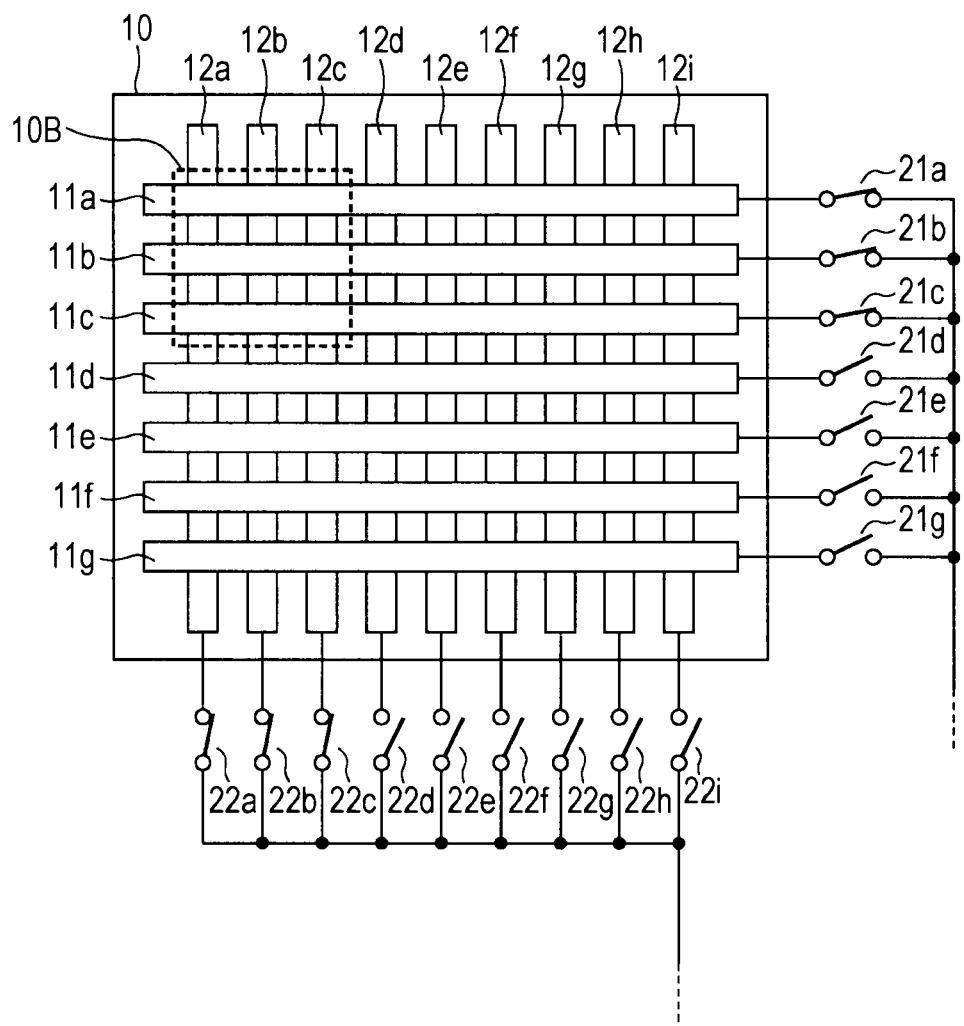
FIG. 7 is a diagram illustrating measurement of a button display region according to the embodiment of the present disclosure.

Next, an example of a case where a measurement region is set in accordance with an application which is being executed in a current display process in step S21 and the measurement region is set in accordance with button display in the display panel is shown in FIG. 7.

In an example shown in FIG. 7, an operation button display 10B is located on the display panel and a priority is given to a region which overlaps with the operation button display 10B as a measurement region. In this example, a region including intersections of the lines 11a to 11c and the lines 12a to 12c is set as a preferential measurement region. The switches 21a to 21c and 22a to 22c which are connected to these lines, respectively, are brought to close states. Since the button display portion is set to be preferentially measured, a determination as to whether the region displayed as a button is touched may be promptly made without making the determination on the entire region.

In the example shown in FIG. 7, only one operation button display 10B is shown. However, when a plurality of operation buttons are displayed, priority levels are assigned to the displayed buttons and a region to be measured in step S22 is determined in accordance with the priority levels.

Figure 8:
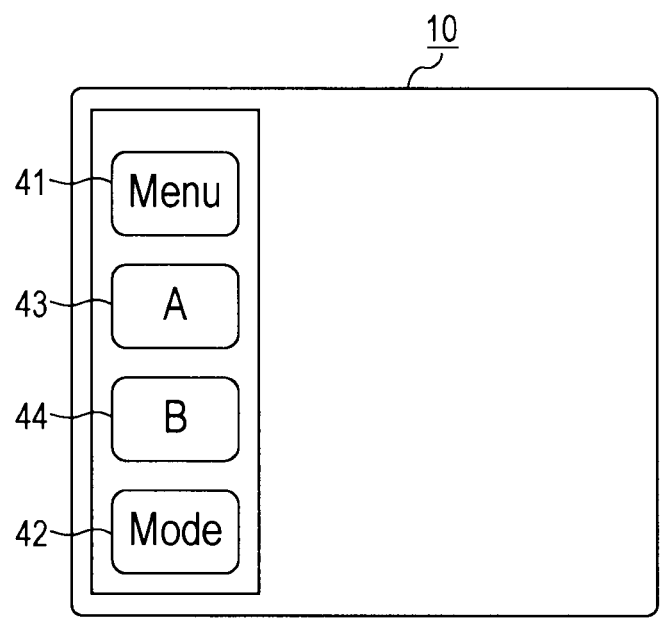
FIG. 8 is a diagram illustrating button display (first example) according to the embodiment of the present disclosure.

It is assumed that four buttons, i.e., a menu button 41, a mode button 42, an A button 43, and a B button 44 are displayed on the panel as shown in FIG. 8. Here, the menu button 41 which is the most likely to be pressed is determined as a first preferential region and the mode button 42 which is the second most likely to be pressed is determined as a second preferential region. Furthermore, the buttons 43 and 44 which are least likely to be pressed when compared with the buttons 41 and 42 are determined as third and fourth preferential regions, respectively.

By this, a determination as to whether each of regions corresponding to the buttons has been touched may be promptly and appropriately made for each button.

Figure 9:
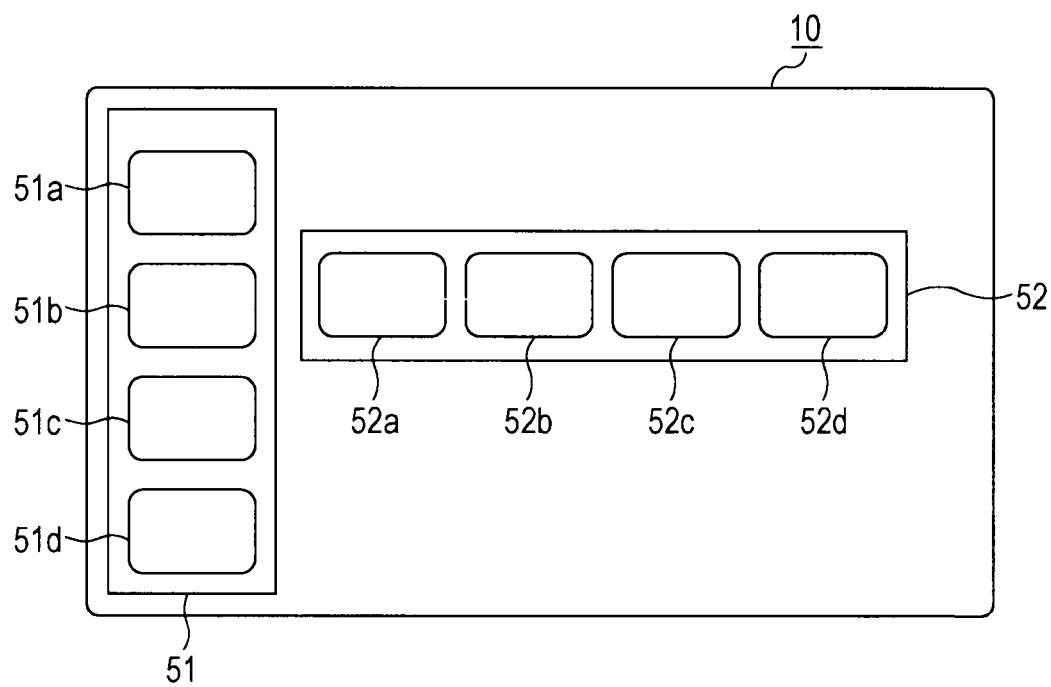
FIG. 9 is a diagram illustrating button display (second example) according to the embodiment of the present disclosure.

FIG. 9 shows an example of another button display.

In this example, four buttons 51a to 51d are displayed in a first layer button display region 51 and four buttons 52a to 52d are displayed in a second layer button display region 52. In the case of this display example, the four buttons 51a to 51d included in the first layer button display region 51 are measured as a first preferential region. Then, when contact or approach is not detected by the measurement, the four buttons 52a to 52d included in the second layer button display region 52 are measured as a second preferential region. If contact or approach is not detected also in the second preferential region, a region other than the button display regions may be also measured.

Figure 10:
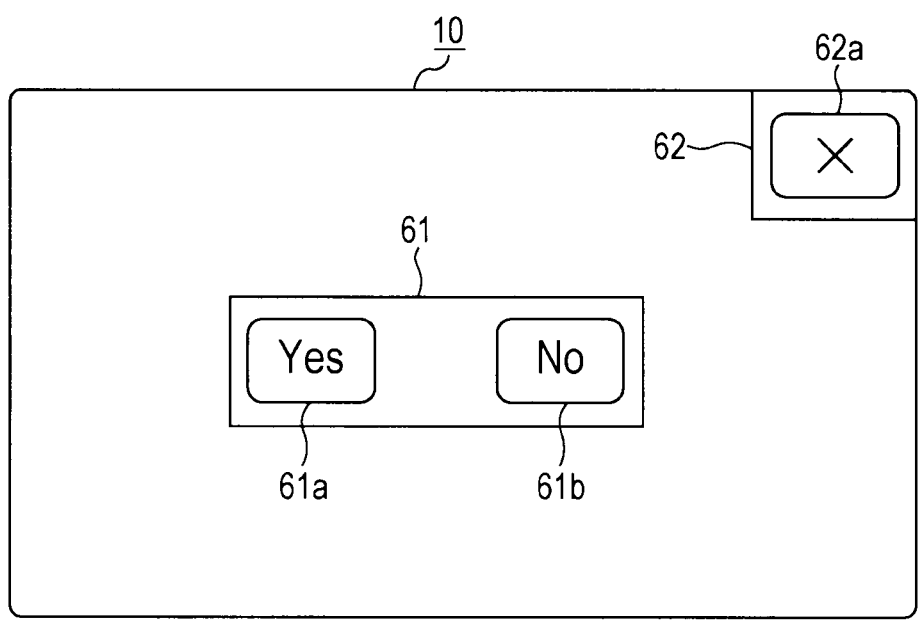
FIG. 10 is a diagram illustrating button display (third example) according to the embodiment of the present disclosure.

FIG. 10 shows an example of further button display.

In the case of this example, a first preferential button region 61 which includes an "YES" button 61a and a "NO" button 61b and which is highly likely to be operated and a second preferential button region 62 which includes a window close button 62a and which is less likely to be operated are set.

In the case of this display example, after regions corresponding to the buttons 61a and 61b included in the first preferential button region 61 are sequentially measured, a region corresponding to the button 62a included in the second preferential button region 62 is measured. When contact or approach is not detected even in the second preferential region, a region other than the button display regions may be measured.

8. Example of Process When Priority Is Given To Preceding Detection Region

As another example of region setting in order of priority, an example of a case where a portion near a position in which contact or approach was detected in a preceding measurement period is set as a region to be preferentially measured will be described. Note that the preceding measurement period means a period before one measurement cycle.

Figure 11:
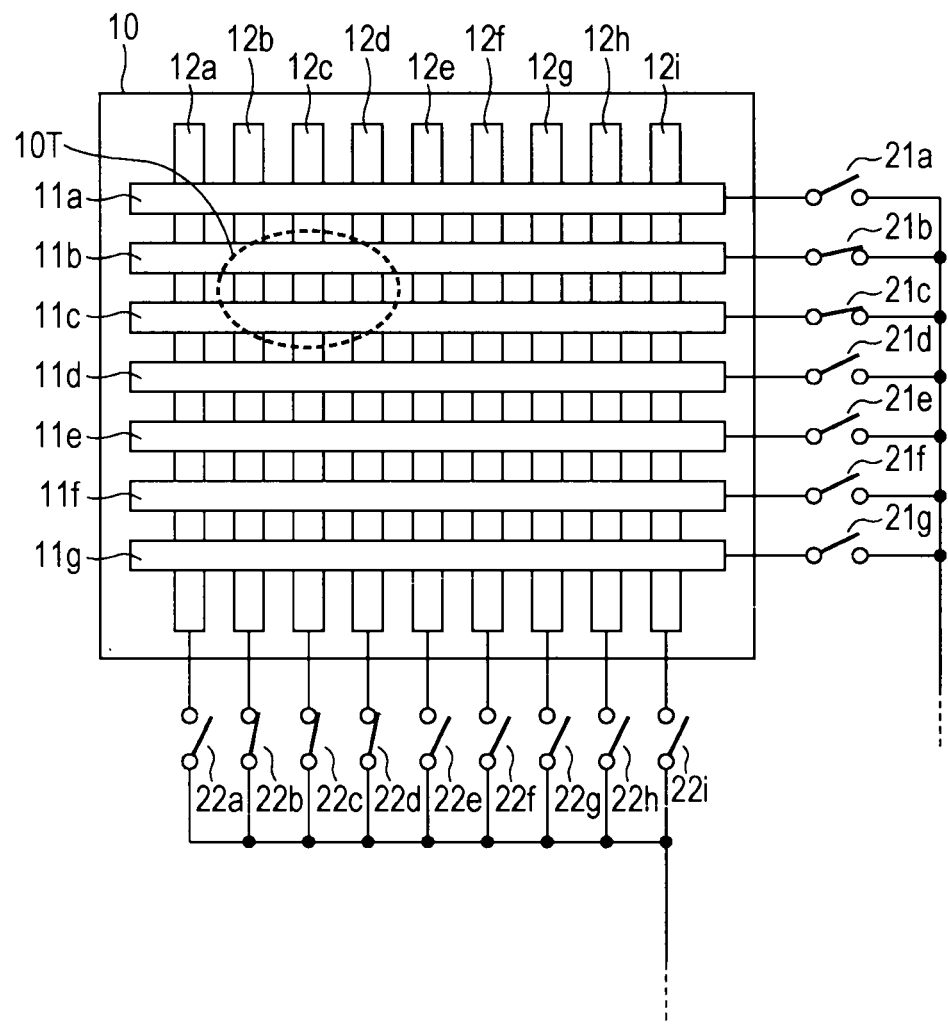
FIG. 11 is a diagram illustrating measurement performed when priority is given to a region which has been previously detected according to the embodiment of the present disclosure.

FIG. 11 shows an example of this case. It is assumed that a touch position 10T is detected as a position in which preceding contact was detected, for example. Here, as shown in FIG. 11, first, the switches 21b, 21c, 22b, 22c, and 22d are brought to close states so that a region corresponding to the touch position 10T is collectively measured is performed.

When contact or approach is not detected in the region in which the preceding contact was detected, other regions are also measured.

9. Example of Region Setting Process Based On Prediction

In the example shown in FIG. 11, the preceding detection region is preferentially measured. However, a region obtained by shifting a preceding contact position which has been detected may be preferentially measured depending on an application which executes display.

Figure 12:
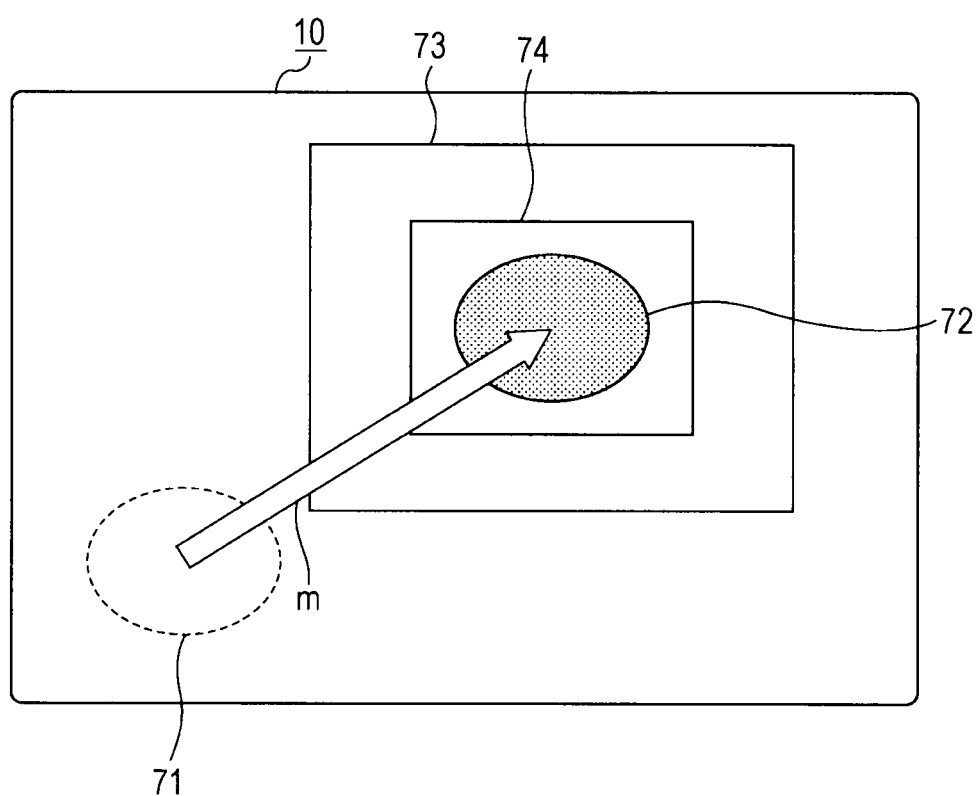
FIG. 12 is a diagram illustrating a region setting process based on prediction according to the embodiment of the present disclosure.

Specifically, as shown in FIG. 12, for example, it is assumed that the controller 31 determines a prediction position 72 which is highly likely to be shifted from a preceding contact position 71 by a contact-state change m which was measured in accordance with change of display and change histories of contact positions. Here, a first preferential measurement region 73 which includes the predicted contact position 72 and which is comparatively small region is set and a second preferential measurement region 74 is further set outside the first preferential measurement region 73.

Then, when contact or approach is not detected in the first preferential measurement region 73, contact or approach is tried to be detected in the second preferential measurement region 74, and when contact or approach is not detected even in the second preferential measurement region 74, other regions are further measured.

10. Example of Execution of Division Measurement

Next, an example of a process performed in step S26 of FIG. 6 in which measurement is terminated after comparison of a measured signal value obtained before division, that is, a signal value obtained by measurement performed on the entire plane with signals of the division regions will be described.

Figure 13A:
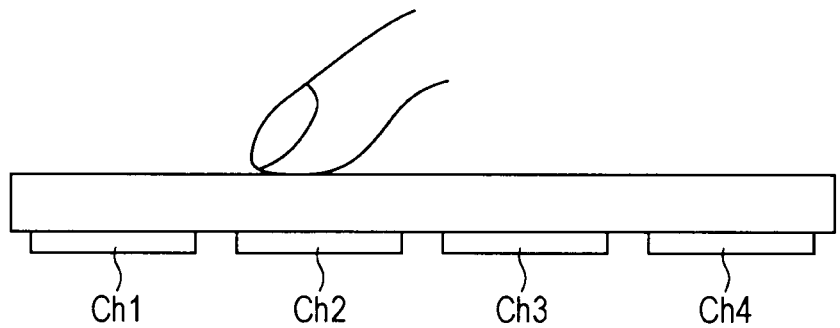
FIGS. 13A to 13C are diagrams illustrating a process of executing division measurement (first example) according to the embodiment of the present disclosure.

As shown in FIG. 13A, a signal value $S_{sum}$ obtained by measurement performed on the entire panel plane before division is stored. It is assumed that the measurement signal value $S_{sum}$ is a value obtained when a region corresponding to the channel Ch2 is touched by a finger as shown in FIG. 13A.

Figure 13B:
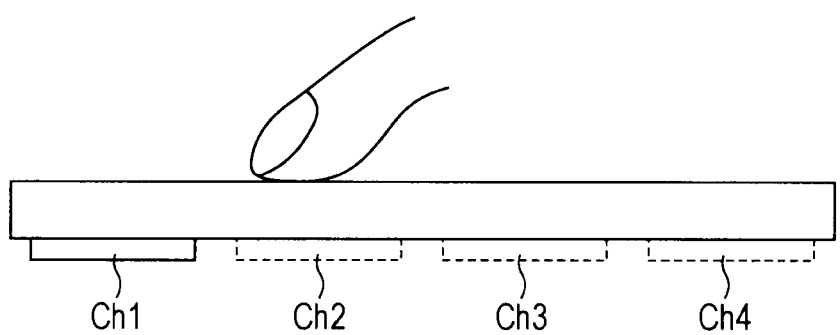

Here, it is assumed that measurement is performed in order from the channel Ch1 as shown in FIG. 13B. A signal value S1 detected in a region corresponding to the channel Ch1 is equal to or smaller than a value obtained by subtracting a threshold value Sth from the measurement signal value $S_{sum}$, and therefore, it is determined that the region corresponding to the channel Ch1 has not been touched.

Figure 13C:
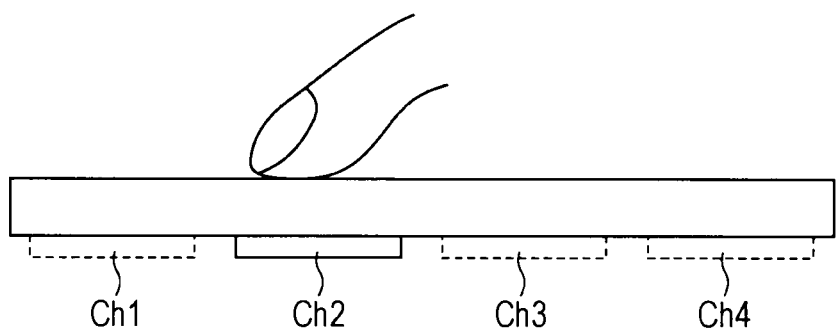

Then, it is assumed that a signal value S2 is detected in a region corresponding to the channel Ch2 as shown in FIG. 13C. Here, a signal value obtained by adding the signal value S1 to the signal value S2 becomes equal to or larger than the value obtained by subtracting the threshold value Sth from the measurement signal value $S_{sum}$. Then, it is determined that the detection of the contact position is terminated, and the measurement in this period is terminated.

Figure 14A:
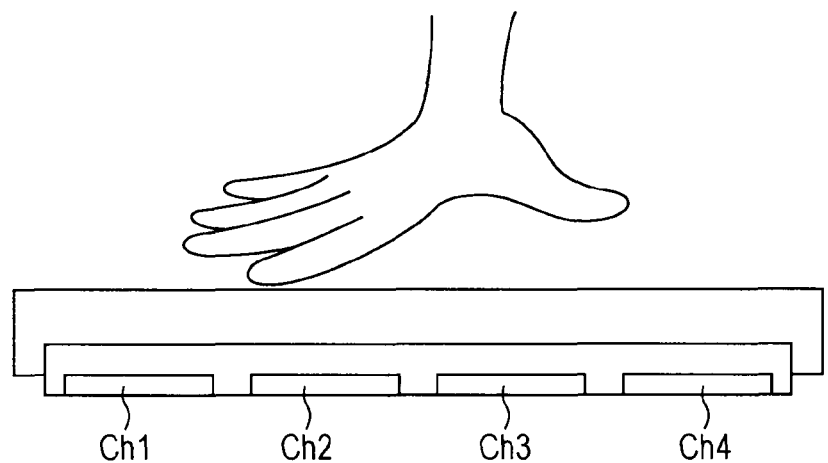
FIGS. 14A to 14C are diagrams illustrating a process of executing division measurement (second example) according to the embodiment of the present disclosure.
Figure 14B:
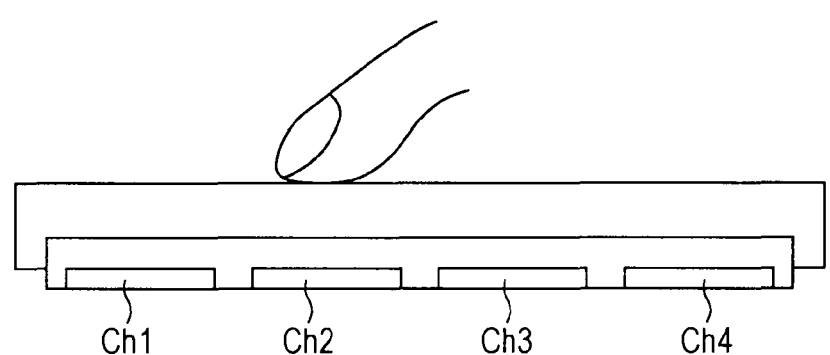
Figure 14C:
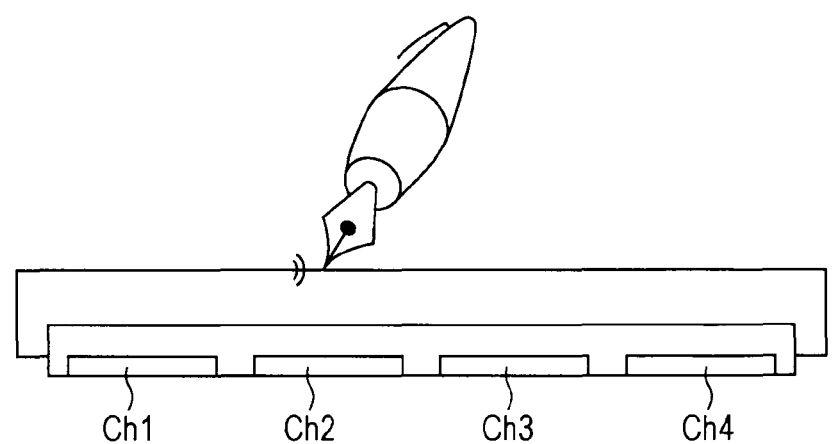

Referring now to FIGS. 14A to 14C, an example of a case where a measurement state is finely divided and an example of a case where the measurement state is not divided will be described.

First, an example shown in FIG. 14A represents a case where a comparatively large region is simultaneously touched by a palm or the like. In this case, a measured signal value $S_{sum}$ is smaller than a first threshold value Sth which is used for simultaneous contact detection of a signal having a comparatively large level, and it is determined that further division and measurement is not to be performed. Accordingly, the measurement in this period is terminated.

FIG. 14B shows an example of a case where a signal value $S_{sum}$, is obtained when a finger contacts. In this case, the measurement signal value $S_{sum}$, is equal to or larger than the first threshold value $Sth_1$ and is equal to or smaller than the a second threshold value $Sth_2$, and the region is divided and re-measurement is performed. In the example shown in FIG. 14B, one of the channels Ch1 to Ch4 serving as division regions is determined by the re-measurement.

FIG. 14C shows an example of a case where a signal value S is obtained by measurement in a state in which the panel plane is touched by a stylus. In this case, it is highly possible that a considerably small point has been touched on the panel, and the regions corresponding to the channels Ch1 to Ch4 are further divided to improve detection accuracy and re-measurement is performed. For example, a process of sequentially measuring intersections in the regions is performed. As described above, even when the panel is touched by the stylus, measurement is performed.

As described above, by performing the process of this embodiment, measurement in one measurement cycle may be performed within a short period of time and with small power consumption. Specifically, in a state in which contact or approach is not detected or a state in which a region in which simultaneous contact is performed is too large to perform detection of a position when measurement is performed on the entire panel first, measurement in small regions is not performed thereafter. Accordingly, the measurement is terminated in a short period of time with small power consumption.

Then, when it is determined that it is possible that contact or approach is detected in a certain position in the measurement of the entire panel, the measurement is performed on the basis of setting of divided regions in an integrated state depending on a user interface (application) currently employed and a priority setting. When a sum of values obtained through measurement of divided regions is compared with an entire measurement value and when it is determined that the measurement is not to be performed anymore (that is, a contact position is not detected in a region other than the measured regions), the measurement process is terminated. Accordingly, the measurement is terminated in a short period of time with small power consumption. Accordingly, reduction of a period of time used for measurement and power consumption and improvement of measurement accuracy are both attained.

Furthermore, since a region to be measured is preferentially set in order from a region which is highly likely to be operated, it is highly possible that the measurement is terminated in a short period of time. Furthermore, even when an operation is predicted, the same advantage is obtained.

Furthermore, in this embodiment, after the measurement is performed on the entire panel, only the four sides surrounding the panel are measured. Accordingly, even when the case out of the panel is contacted and the contact is not detected, measurement is not performed after that. Accordingly, in this state, the measurement is immediately terminated and unnecessary measurement is not performed.

11. Modifications

Note that, in the foregoing embodiment, the lines are disposed on the panel in a grid pattern and contact or approach is detected by change of an electrostatic capacitance in the touch panel apparatus. However, other signal measurement methods may be applied to the touch panel apparatus.

For example, the present disclosure is applicable to a resistive touch panel which includes transparent electrodes on a panel and which employs a method for measuring change of a voltage in accordance with change of a resistance value caused by contact or approach of a finger or the like. Alternatively, the present disclosure is applicable to a pressure (pressure-sensitive) touch panel which detects a pressure obtained when an object contacts the panel. Alternatively, the present disclosure is applicable to touch panels employing methods other than these methods.

Furthermore, in the foregoing embodiment, a method for determining a detection position by selecting a line to which a measurement signal is supplied and a line used to obtain a detection signal is employed. On the other hand, the present disclosure is applicable to a touch panel apparatus employing a method for selecting a detection position by arranging switches in intersections of lines disposed in a grid pattern and by selecting one of the switches at the intersections.

Furthermore, in the foregoing embodiment, the touch panel apparatus is configured as a dedicated touch panel including a controller which performs the process of this embodiment. However, the present disclosure may be applied to a general apparatus such as a computer apparatus including a touch panel, for example. In this case, as a control program of the touch panel of the computer apparatus, a program which executes the processing method shown in the flowchart of FIG. 6 may be implemented.

The present disclosure contains subject matter related to that disclosed in Japanese Priority Patent Application JP 2010-261359 filed in the Japan Patent Office on Nov. 24, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel apparatus, comprising:
    a detector configured to detect contact or approach of an object to a panel within a detection range of the panel;
    a controller configured to
        execute the detection on a first detection range corresponding to the entire panel simultaneously based on a single signal state measurement for all individual electrode lines disposed in a grid pattern on a certain plane of the panel or all intersections of all the individual electrode lines, and
        control a second detection range in accordance with a result of the detection on the first detection range corresponding to the entire panel, wherein the second detection range is determined when a detection value of individual electrode lines or intersections in peripheral ends of the panel is less than a second threshold value; and an output unit configured to determine and output a position corresponding to the contact or the approach of the object within the second detection range controlled by the controller.

2. A touch-panel detection method, comprising:
    detecting contact or approach of an object to a panel within a detection range of the panel;
    executing, by circuitry, the detection on a first detection range corresponding to the entire panel simultaneously based on a single signal state measurement for all individual electrode lines disposed in a grid pattern on a certain plane of the panel or all intersections of all the individual electrode lines;
    controlling a second detection range in accordance with a result of the detection on the first detection range corresponding to the entire panel, wherein the second detection range is determined when a detection value of individual electrode lines or intersections in peripheral ends of the panel is less than a second threshold value; and
    determining and outputting, by the circuitry, a position corresponding to the contact or the approach of the object within the controlled second detection range.

3. The touch-panel detection method according to claim 2, wherein the detection is performed on all the individual electrode lines which are integrated or all the intersections which are integrated and the second detection range of individual electrode lines or intersections to be detected is controlled in accordance with a result of the detection, and
    a position of the contact or the approach of the object is detected using the individual electrode lines or the intersections in the second detection range and information on the position is output.

4. The touch-panel detection method, according to claim 3, wherein an integration region determination process is performed to determine a state of integration of the individual electrode lines or the intersections in the second detection range.

5. The touch-panel detection method, according to claim 4, wherein the integration state of a plurality of individual electrode lines or intersections in the second detection range is set depending on a user interface.

6. The touch-panel detection method according to claim 5, wherein an entire detection signal value obtained by the single signal state measurement when all the individual electrode lines or intersections are integrated and the detection performed is compared with an addition value of detection signal values obtained when a first detection region is divided into regions and the detection is performed on one of the divided regions, and control is performed such that, when the addition value of the detection signal values of one of the divided regions is substantially equal to or larger than the entire detection signal value, detection is not performed on the other divided regions.

7. The touch-panel detection method, according to claim 5, wherein, when a detection signal value corresponding to the single signal state measurement obtained by integrating all the individual electrode lines or all the intersections and performing the detection is less than a first threshold value, control is performed such that detection is not performed on regions obtained by dividing the first detection range.

8. The touch-panel detection method, according to claim 4, wherein a plurality of individual electrode lines or intersections in a range to be subjected to detection performed by a detector are set to the integration state depending on a preceding detection region.

9. The touch-panel detection method, comprising:
    detecting contact or approach of an object to a panel within a detection range of the panel;
    executing, by circuitry, the detection on a first detection range corresponding to the entire panel simultaneously based on a single signal state measurement for all individual electrode lines disposed in a grid pattern on a certain plane of the panel or all intersections of all the individual electrode lines;
    controlling a second detection range in accordance with a result of the detection on the first detection range corresponding to the entire panel, wherein control is performed such that detection is performed on individual electrode lines or intersections located in peripheral ends of the panel in addition to the detection performed by a detector on all integrated individual electrode lines or all integrated intersections, and a detection including determination of the second detection range is not performed when a detection value of the individual electrode lines or the intersections in the peripheral ends of the panel is equal to or larger than a second threshold value; and
    determining and outputting, by the circuitry, a position corresponding to the contact or the approach of the object within the controlled second detection range.

10. A touch panel apparatus, comprising:
    circuitry configured to:
    detect contact or approach of an object to a panel within a detection range of the panel;
    execute the detection on a first detection range corresponding to the entire panel simultaneously based on a single signal state measurement for all individual electrode lines disposed in a grid pattern on a certain plane of the panel or all intersections of all the individual electrode lines;
    control a second detection range in accordance with a result of the detection on the first detection range corresponding to the entire panel, wherein the second detection range is determined when a detection value of individual electrode lines or intersections in peripheral ends of the panel is less than a second threshold value; and
    determine and output a position corresponding to the contact or the approach of the object within the controlled second detection range.

11. The touch panel apparatus according to claim 10, wherein the circuitry
    executes the detection on all the individual electrode lines which are integrated or all the intersections which are integrated and controls the second detection range of individual electrode lines or intersections to be detected, and
    determines and outputs a position of the contact or the approach of the object using the individual electrode lines or the intersections in the controlled second detection range.

12. The touch panel apparatus according to claim 11, wherein the circuitry includes an integration region determination processor which determines a state of integration of the individual electrode lines or the intersections in the second detection range.

13. The touch panel apparatus according to claim 12, wherein the circuitry sets the integration state of a plurality of individual electrode lines or intersections in the second detection range depending on a user interface.

14. The touch panel apparatus according to claim 13,
wherein the circuitry compares an entire detection signal value obtained by the single signal state measurement when all the individual electrode lines or intersections are integrated and the detection is performed by the circuitry with an addition value of detection signal values obtained when the first detection range is divided into regions and the detection on one of the divided regions is performed, and performs control such that, when the addition value of the detection signal values of one of the divided regions is substantially equal to or larger than the entire detection signal value, detection is not performed on the other divided regions.

15. The touch panel apparatus according to claim 13,
wherein the circuitry performs control, when a detection signal value corresponding to the single signal state measurement obtained by integrating all the individual electrode lines or all the intersections and performing the detection by the circuitry is less than a first threshold value, such that detection is not performed on regions obtained by dividing the first detection range.

16. The touch panel apparatus according to claim 12,
wherein the circuitry sets a plurality of individual electrode lines or intersections in a range to be subjected to detection performed by the circuitry to the integration state depending on a preceding detection region.

17. The touch panel apparatus according to claim 10,
wherein the circuitry causes the detection on individual electrode lines or intersections located in peripheral ends of the panel to be performed in addition to the detection performed on all integrated individual electrode lines or all integrated intersections, and not to perform detection by determining the second detection range when a detection value of the individual electrode lines or the intersections in the peripheral ends of the panel is equal to or larger than a second threshold value.

18. The touch panel apparatus according to claim 10,
wherein the circuitry is configured to execute the detection on the first detection range corresponding to the entire panel simultaneously based on comparison between the measured single signal state measurement of the entire panel and a predetermined a first threshold value.

* * * * *